United States Patent [19]

Ogawa et al.

[11] 4,387,756

[45] Jun. 14, 1983

[54] PNEUMATIC TIRES

[75] Inventors: Masaki Ogawa, Sayama; Mikihiko Ikegami, Tokorozawa, both of Japan

[73] Assignee: Bridgestone Tire Company Limited, Tokyo, Japan

[21] Appl. No.: 300,536

[22] Filed: Sep. 9, 1981

[30] Foreign Application Priority Data

Sep. 10, 1980 [JP] Japan ............................ 55-124662

[51] Int. Cl.³ .................... B60C 11/00; B60C 1/00
[52] U.S. Cl. ............................ 152/209 R; 152/374; 526/340
[58] Field of Search ................. 152/209, 330, 374; 526/340

[56] References Cited

U.S. PATENT DOCUMENTS 4,334,567  6/1982  Bond ............................ 152/209 R

FOREIGN PATENT DOCUMENTS 1212386 11/1970 United Kingdom .
1231657  5/1971 United Kingdom .
1261371  1/1972 United Kingdom .
1461373  1/1977 United Kingdom .
1496359 12/1977 United Kingdom .
2071117  9/1981 United Kingdom .

OTHER PUBLICATIONS

Blow, C. M., *Rubber Technology and Manufacture*, CRC Press, 1971, pp. 89–93.
Haws et al., *Rubber Industry*, 9(3) 107 (June, 1975), "Second Generation Solution Polymers", pp. 107–111.

*Primary Examiner*—Edward C. Kimlin
*Assistant Examiner*—Lois E. Boland
*Attorney, Agent, or Firm*—Sughrue, Mion, Zinn, Macpeak and Seas

[57] ABSTRACT

A pneumatic tire having a tread is disclosed, which comprises using in said tread a rubber composition containing 10 to 120 parts by weight of carbon black and 0.5 to 5 parts by weight of a vulcanizer based on 100 parts by weight of a novel styrene-butadiene copolymer rubber as defined below alone or a blend rubber of not less than 30 parts by weight of said copolymer rubber and not more than 70 parts by weight of the other diene rubber, said styrene-butadiene copolymer rubber being obtained by random copolymerization of styrene with 1,3-butadiene and satisfying the following requirements:

(1) a content of bound styrene is 12 to 35% by weight;
(2) a content of 1,2-bond in butadiene portion is 25 to 45% by weight;
(3) a content of trans-1,4 bond in butadiene portion is not less than 42% by weight;
(4) a value obtained by subtracting a content of cis-1,4 bond in butadiene portion from said content of trans-1,4 bond is not less than 8% by weight;
(5) a relation between said content of bound styrene and said content of 1,2-bond is $65 \leq 1.7 \times$ the content of bound styrene (% by weight) + the content of 1,2-bond (% by weight) $\leq 100$; and
(6) a ratio of weight mean molecular weight ($\overline{M}_w$) to number mean molecular weight ($\overline{M}_n$) is not more than 2.3.

3 Claims, No Drawings

PNEUMATIC TIRES

This invention relates to pneumatic tires, and more particularly to pneumatic tires which can simultaneously and remarkably improve wet skid resistance, rolling resistance, fracture resistance and wear resistance by using in a tread a rubber composition containing a novel styrene-butadiene copolymer rubber.

Styrene-butadiene copolymer rubbers have widely been used in a tread for tires owing to an excellent wet skid resistance on a wet road and a good wear resistance. However, the energy loss is large and the heat generation is apt to occur, so that these rubbers are hardly applied to large-size pneumatic tires.

On the other hand, the wet skid resistance becomes important in the large-size pneumatic tire with the popularization of expressways. Furthermore, in relatively small-size pneumatic tires previously using the styrene-butadiene copolymer rubber, it is significant to reduce the energy loss or rolling resistance from viewpoint of recent resource and energy savings. Therefore, it is strongly demanded to develop novel rubbers which have an excellent wet skid resistance and a small energy loss and can be used in both the large-size and small-size tires.

For this purpose, there have been proposed so-called high vinyl polybutadiene rubbers or high vinyl styrene-butadiene copolymer rubbers, which contain 50–90% by weight of 1,2-bond. However, when these rubbers are applied to a tread of a tire, the wet skid resistance and rolling resistance are certainly improved to some extent, while the wear resistance, fracture resistance and the like are considerably degraded in case of the high vinyl polybutadiene rubber and are fairly degraded in case of the high vinyl styrene-butadiene copolymer rubber likewise the high vinyl polybutadiene rubber. Therefore, when such a tire is used under slightly severe conditions, wear rapidly occurs, so that this tire is considerably unfavorable for use in practice.

Namely, there are not yet realized pneumatic tires, which have all of good wet skid resistance, rolling resistance, fracture resistance and wear resistance and are very useful in practical use, up to present.

With the foregoing in mind, the inventors have made various studies with respect to styrene-butadiene copolymer rubbers and found out the following facts.

That is, it has hitherto been considered that since the improvement of wet skid resistance is contrary to the reduction of rolling resistance, it is relatively difficult to simultaneously solve such a contrary performances. This is due to the fact that there are watched only factors having a most influence on each performance. However, many primary properties (e.g. content of cis-1,4 bond, content of bound styrene, molecular weight, branching degree and the like) are naturally concerned in one of performances, so that overall viewpoints on these primary properties make possible to further improve the contrary performances as described above.

Accordingly, the inventors have made further investigations with respect to the wet skid resistance and rolling resistance inclusive of the fracture resistance and wear resistance from the above viewpoints and as a result, the invention has been accomplished. That is, according to the invention, there is the provision of a pneumatic tire having a tread, which comprises using in said tread a rubber composition containing 10 to 120 parts by weight of carbon black and 0.5 to 5 parts by weight of a vulcanizer based on 100 parts by weight of a novel styrene-butadiene copolymer rubber as defined below alone or a blend rubber of not less than 30 parts by weight of said copolymer rubber and not more than 70 parts by weight of the other diene rubber, said styrene-butadiene copolymer rubber being obtained by random copolymerization of styrene with 1,3-butadiene and satisfying the following requirements:

(1) a content of bound styrene is 12 to 35% by weight;
(2) a content of 1,2-bond in butadiene portion is 25 to 45% by weight;
(3) a content of trans-1,4 bond in butadiene portion is not less than 42% by weight;
(4) a value obtained by subtracting a content of cis-1,4 bond in butadiene portion from said content of trans-1,4 bond is not less than 8% by weight;
(5) a relation between said content of bound styrene and said content of 1,2-bond is $65 \leq 1.7 \times$ the content of bound styrene (% by weight) + the content of 1,2-bond (% by weight) $\leq 100$; and
(6) a ratio of weight mean molecular weight ($\overline{M}_w$) to number mean molecular weight ($\overline{M}_n$) is not more than 2.3.

In the novel styrene-butadiene copolymer rubber to be used in the invention, the bound styrene is closely related to the strength at rupture of the above copolymer rubber. That is, when the content of bound styrene is up to about 35% by weight, if styrene is randomly distributed, the strength at rupture of the copolymer rubber becomes higher in proportion to the content of bound styrene. On the other hand, viewing from the energy loss, the smaller the content of bound styrene, the smaller the energy loss of the copolymer rubber. Besides, considering the synergistic effect with trans-1,4 bond as mentioned below, the content of bound styrene according to the invention is 12 to 35% by weight, preferably 15 to 28% by weight. Moreover, the term "random distribution" used herein means that a block content of bound styrene is not more than 10% by weight when measuring by an oxidative destruction process as described by I. M. Kolthoff et al in J. Polymer Sci., 1, 429 (1946).

In the butadiene portion of the copolymer rubber, 1,2-bond has an effect of making the energy loss smaller in addition to the effect of improving the wet skid resistance of the copolymer rubber. Therefore, the larger the content of 1,2-bond, it is more advantageous to satisfy both the wet skid resistance and rolling resistance. However, when the content of 1,2-bond is too large, the interaction with carbon black becomes small, so that the strength at rupture and wear resistance of the copolymer rubber considerably lower. Thus, according to the invention, it is necessary that the content of 1,2-bond is 25 to 45% by weight, preferably 30 to 40% by weight.

Furthermore, the relation between the content of bound styrene and the content of 1,2-bond is a great factor contributing to the wet skid resistance and rolling resistance. Particularly, the content of bound styrene gives a greater contribution and can be considered independently because it is represented as % by weight of the copolymer rubber, but the change of the content of bound styrene changes the content of butadiene. Since the content of 1,2-bond is represented as % by weight of butadiene portion, it is apparently influenced by the content of bound styrene. Therefore, the requirement satisfying both the wet skid resistance and rolling resistance is represented by the content of bound styrene and the content of 1,2-bond as a function of the content of bound styrene. As a result of examinations, it has been found that in the copolymer rubber wherein the content of bound styrene is 10 to 35% by weight, the content of 1,2-bound in butadiene portion is 25 to 80% by weight, the content of trans-1,4 bond is not less than 20% by weight and the ratio $\overline{M}_w/\overline{M}_n$ is not more than 2.5, the above requirement can be approximated by the following equation:

$$65 \leq 1.7 \times \text{content of bound styrene (\% by weight)} + \text{content of 1,2-bond (\% by weight)} \leq 100$$

That is, when the contents of bound styrene and 1,2-bond are within the above defined range, the wet skid resistance and rolling resistance can simultaneously be satisfied. When the value is less than 65, the wet skid resistance deteriorates and is never improved even when changing the other factors such as the content of trans-1,4 bond and the like. While, when the value exceeds 100, even if the other factors are changed, the rolling resistance cannot be improved.

In butadiene portion, trans-1,4 bond is largely concerned in the wear resistance of the copolymer rubber. That is, the larger the trans-1,4 bond, the more the improvement of the wear resistance. Therefore, according to the invention, the content of trans-1,4 bond is not less than 42% by weight. Such a phenomenon is peculiar to the styrene-butadiene copolymer rubber wherein the content of bound styrene is not less than 12% by weight. Inversely, the wear resistance is degraded when the content of bound styrene is less than 12% by weight or in case of butadiene homopolymers containing no styrene. Furthermore, the above phenomenon is produced by the balance with cis-1,4 bond, so that when the cis-1,4 bond is too large, it is not favorable in order to sufficiently develop the effect of improving the wear resistance by the trans-1,4 bond. Thus, according to the invention, it is necessary that a value obtained by subtracting the content of cis-1,4 bond from the content of trans-1,4 bond is not less than 8% by weight, preferably not less than 10% by weight.

Regarding the molecular weight distribution, the ratio $\overline{M}_w/\overline{M}_n$ of weight mean molecular weight ($\overline{M}_w$) to number mean molecular weight ($\overline{M}_n$) is related to the wear resistance of the copolymer rubber likewise the trans-1,4 bond. That is, the smaller the ratio $\overline{M}_w/\overline{M}_n$, the better the wear resistance. According to the invention, it is necessary that the ratio $\overline{M}_w/\overline{M}_n$ is not more than 2.3, preferably not more than 2.1.

The copolymer rubber as mentioned above may be used alone in the tread of the tire or, if necessary, may be blended with not more than 70 parts by weight, preferably not more than 50 parts by weight, based on 100 parts by weight of total rubber content, of the other diene rubber such as natural rubber, polybutadiene rubber, synthetic polyisoprene rubber, butadiene-acrylonitrile copolymer rubber, styrene-butadiene copolymer rubber other than the above defined copolymer rubber and the like.

Moreover, the above novel copolymer rubber is, for example, prepared as follows: that is, 25 kg of cyclohexane, 1.4 kg of styrene, 4.5 kg of 1,3-butadiene, 2.6 g of n-butyl lithium, 0.5 g of sodium dodecylbenzene sulfonate and 1.8 g of ethylene glycol dimethyl ether are charged into a reaction vessel of 50 l capacity and polymerized therein at a polymerization temperature of 46° C. under a nitrogen atmosphere for 1.5 hours and thereafter the remaining catalyst is removed and then the resulting product is dried. In this case, the content of 1,2-bond can be controlled by changing the polymerization temperature, while the content of trans-1,4 bond, the content of cis-1,4 bond and the like can be controlled by changing the addition amounts of sodium dodecylbenzene sulfonate, ethylene glycol dimethyl ether and n-butyl lithium.

In the pneumatic tire according to the invention, the rubber composition to be used in the tread contains 10 to 120 parts by weight of carbon black and 0.5 to 5 parts by weight of a vulcanizer based on 100 parts by weight of the rubber. When the content of carbon black is less than 10 parts by weight, the reinforcing effect is less, while when the above content exceeds 120 parts by weight, the workability such as kneading or the like is deteriorated. On the other hand, when the content of the vulcanizer is less than 0.5 part by weight, the vulcanizing effect cannot be expected sufficiently, while when the above content exceeds 5 parts by weight, the hardness is too high and the resulting vulcanized rubber is unsuitable for use in the tread. As the carbon black, it is preferable to use carbon black having an iodine adsorption value of not less than 36 mg/l and a dibutyl phthalate adsorption value of not less than 60 ml/100 g in order to more improve the wear resistance and reinforcing effect. As the vulcanizer, there is used at least one substance selected from sulfur, p-quinone dioxime, p,p'-dibenzoylquinone dioxime, 4,4'-dithiodimorpholine, poly-p-dinitrosobenzene, ammonium benzoate and alkylphenol disulfide. It is preferable to use one or more of sulfur, 4,4'-dithiodimorpholine and alkylphenol disulfide and the use of sulfur is most preferable.

In the pneumatic tire according to the invention, the rubber composition to be used in the tread may further contain an inorganic filler such as silica, bentonite, clay, titanium oxide, talc, china clay, diatomaceous earth, chalk or the like; a vulcanization accelerator such as N-oxydiethylene-2-benzothiazole sulfeneamide, di-2-benzothiazyl disulfide, N-cyclohexyl-2-benzothiazole sulfeneamide or the like; an accelerator activator such as zinc white, stearic acid or the like; a softener such as aromatic oil or the like; and an antioxidant such as N-phenyl-N'-isopropyl-p-phenylenediamine, phenyl-β-naphthylamine, 2-mercaptobenzimidazole or the like, each of which being added in an amount usually used in ordinary rubber industry, in addition to the above mentioned carbon black and vulcanizer.

The pneumatic tire according to the invention may be reinforced with organic fiber cords of nylon, vinylon, polyester, KEVLAR (trade name) and the like or inorganic fiber cords of steel, glass, carbon and the like. Furthermore, the carcass of this tire may take anyone of radial structure and bias structure, but it is preferably the radial structure.

According to the invention, the pneumatic tires having the above mentioned construction simultaneously and considerably improve the wet skid resistance, rolling resistance, fracture resistance and wear resistance, so that they are very useful in practical use.

The invention will now be described in greater detail with reference to the following examples.

EXAMPLE 1

First of all, there were provided 19 kinds of styrene-butadiene copolymer rubbers as shown in the following Table 1. Then, 19 kinds of rubber compositions were prepared by adding 50 parts by weight of HAF carbon black, 10 parts by weight of aromatic oil, 2 parts by weight of stearic acid, 1 part by weight N-phenyl-N'-isopropyl-p-phenylenediamine, 4 parts by weight of zinc white, 0.6 part by weight of N-oxydiethylene-2-benzothiazole sulfeneamide, 0.8 part by weight of di-2-benzothiazyl disulfide and 1.5 parts by weight of sulfur to 100 parts of each of these styrene-butadiene copolymer rubbers. The strength at rupture (Tb) of each of these rubber compositions was evaluated according to a method of JIS K-6301. Thereafter, pneumatic tires having a tire size of 165 SR 13 were manufactured by using the above mentioned rubber composition in a tread and the wet skid resistance, rolling resistance and wear resistance thereof were evaluated to obtain results as shown in Table 1.

Moreover, the performance evaluation and the microstructure of styrene-butadiene copolymer rubber were measured as follows.

Wet skid resistance

A vehicle provided with the test tire was run on a wet concrete road having a water level of 3 mm at a speed of 80 km/hr and then subjected to rapid braking at the above speed. Then, a running distance required for completely stopping the vehicle was measured. When a tire using the styrene-butadiene copolymer rubber of Sample No. 20 of Table 1 is a control tire, the wet skid resistance of the test tire was evaluated by the following equation:

$$\frac{\left(\begin{array}{c}\text{Running distance}\\\text{of control tire}\end{array}\right) - \left(\begin{array}{c}\text{Running distance}\\\text{of test tire}\end{array}\right)}{(\text{Running distance of control tire})} \times 100$$

Rolling resistance

The test tire subjected to an internal pressure of 1.7 kg/cm² was trained on a steel drum with a diameter of 1,707.6 mm and a width of 350 mm, which was rotated by the driving of a motor, at a speed of 80 km/hr under a JIS 100% load (385 kg) for 30 minutes and thereafter the rotating speed of the drum was raised to 100 km/hr. Then, the driving of the motor was stopped to run the drum by inertia, during which the rolling resistance of the tire to the drum at a speed of 50 km/hr was measured on a basis of deceleration speed of drum and time change. Next, a net rolling resistance of the tire was determined by subtracting the previously calculated drum resistance from the measured value. Moreover, the rolling resistance of the test tire was evaluated by the following equation likewise the evaluation of the wet skid resistance:

$$\frac{\left(\begin{array}{c}\text{Rolling resistance}\\\text{of control tire}\end{array}\right) - \left(\begin{array}{c}\text{Rolling resistance}\\\text{of test tire}\end{array}\right)}{(\text{Rolling resistance of control tire})} \times 100$$

Wear resistance

After the test tire was run over a distance of 10,000 km, the depth of the remaining tread groove was measured, from which a running distance required for wearing the tread only by 1 mm was calculated and defined as a wear resistance by an index on the basis that the control tire is 100. The larger the index value, the better the wear resistance.

Microstructure

The content of bound styrene was measured by means of a spectrophotometer using an absorbance of 699 cm$^{-1}$, and the microstructures in butadiene portion were measured by a D. Morero's method [Chem. & Ind., 41, 758 (1959)]. Further, the ratio $\overline{M}_w/\overline{M}_n$ was measured in a solution of 0.5 g/100 ml of tetrahydrofuran by means of a measuring apparatus, Waters GPC 200.

TABLE 1(a)

| | Sample No. | | | | | | | | | |
|---|---|---|---|---|---|---|---|---|---|---|
| | 1 Example | 2 Example | 3 Example | 4 Example | 5 Example | 6 Example | 7 Example | 8 Comparative Example | 9 Comparative Example | 10 Comparative Example |
| Microstructure | | | | | | | | | | |
| Content of bound styrene (wt. %) | 22 | 17 | 28 | 21 | 13 | 33 | 30 | 22 | 22 | 22 |
| Content of trans-1,4 bond (wt. %) | 43 | 49 | 49 | 45 | 45 | 43 | 60 | 51 | 26 | 18 |
| Content of cis-1,4 bond (wt. %) | 23 | 11 | 20 | 15 | 10 | 17 | 15 | 26 | 28 | 20 |
| Content of trans-1,4 bond − content of cis-1,4 bond (wt. %) | 20 | 38 | 29 | 30 | 35 | 26 | 45 | 25 | −2 | −2 |
| Content of 1,2-bond (wt. %) | 34 | 40 | 31 | 40 | 45 | 40 | 25 | 23 | 46 | 62 |
| $\overline{M}_w/\overline{M}_n$ | 2.1 | 1.9 | 1.9 | 1.8 | 2.0 | 1.6 | 1.8 | 1.9 | 2.3 | 1.9 |
| 1.7 × content of bound styrene + content of 1,2-bond (wt. %) | 71.4 | 68.9 | 78.6 | 75.7 | 67.1 | 96.1 | 79.1 | 60.4 | 83.4 | 99.4 |
| Results | | | | | | | | | | |
| Strength at rupture (kg/cm²) | 218 | 215 | 228 | 209 | 211 | 215 | 233 | 221 | 182 | 162 |
| Wet skid resistance (%) | +9 | +7 | +6 | +7 | +1 | +13 | +8 | −6 | +7 | +12 |
| Rolling resistance (%) | +10 | +8 | +5 | +3 | +10 | +2 | +3 | 0 | +2 | −6 |
| Wear resistance (index) | 118 | 109 | 122 | 118 | 105 | 103 | 123 | 121 | 82 | 75 |

TABLE 1(b)

| | Sample No. | | | | | | | | | |
|---|---|---|---|---|---|---|---|---|---|---|
| | 11 Comparative Example | 12 Comparative Example | 13 Comparative Example | 14 Comparative Example | 15 Comparative Example | 16 Comparative Example | 17 Comparative Example | 18 Comparative Example | 19 Comparative Example | 20* Control |
| Microstructure | | | | | | | | | | |
| Content of bound styrene (wt. %) | 22 | 22 | 22 | 8 | 37 | 22 | 10 | 15.1 | 34 | 23.5 |
| Content of trans-1,4 bond (wt. %) | 42 | 38 | 42 | 52 | 43 | 48 | 44 | 44 | 42 | 66 |
| Content of cis-1,4 bond (wt. %) | 12 | 22 | 35 | 23 | 27 | 24 | 22 | 25 | 13 | 15 |
| Content of trans-1,4 bond — content of cis-1,4 bond (wt. %) | 30 | 16 | 7 | 29 | 17 | 24 | 25 | 19 | 29 | 51 |
| Content of 1,2-bond (wt. %) | 46 | 40 | 23 | 25 | 30 | 28 | 34 | 31 | 45 | 19 |
| $M_w/M_n$ | 1.9 | 2.0 | 2.3 | 2.2 | 2.2 | 2.5 | 1.7 | 2.2 | 1.9 | 3.5 |
| 1.7 × content of bound styrene + content of 1,2-bond (wt. %) | 83.4 | 77.4 | 66.4 | 38.6 | 92.9 | 65.4 | 51.0 | 56.7 | 102.8 | 59.0 |
| Results | | | | | | | | | | |
| Strength at rupture (kg/cm²) | 178 | 198 | 219 | 198 | 188 | 208 | 198 | 203 | 225 | 230 |
| Wet skid resistance (%) | +9 | +7 | +3 | −14 | +12 | +3 | −9 | −4 | +8 | 0 |
| Rolling resistance (%) | −5 | +2 | +5 | +9 | −8 | +1 | +7 | +2 | −12 | 0 |
| Wear resistance (index) | 80 | 93 | 91 | 93 | 83 | 96 | 104 | 102 | 87 | 100 |

*SBR 1500

As apparent from Table 1, the pneumatic tires according to the invention using in the tread the novel styrene-butadiene copolymer rubber are considerably excellent in the wet skid resistance, rolling resistance, fracture resistance and wear resistance.

EXAMPLE 2

A rubber composition having a compounding recipe as shown in the following Table 2 was prepared, which was used in a tread of a pneumatic tire. The performances of the resulting tire were evaluated in the same manner as described in Example 1 to obtain results as shown in Table 2.

TABLE 2

| | Comparative Example | Comparative Example | Example | Example | Example |
|---|---|---|---|---|---|
| Styrene-butadiene copolymer rubber SBR1500 | | | | | 15 |
| Polybutadiene rubber BR01 | | | | | 15 |
| Natural rubber | 80 | 75 | 70 | 50 | 40 |
| Novel copolymer rubber (Sample No. 1) | 20 | 25 | 30 | 50 | 30 |
| HAF carbon black | 50 | 50 | 50 | 50 | 50 |
| Aromatic oil | 10 | 10 | 10 | 10 | 10 |
| N—phenyl-N'—isopropyl-p-phenylenediamine | 1 | 1 | 1 | 1 | 1 |
| Stearic acid | 2 | 2 | 2 | 2 | 2 |
| Zinc white | 4 | 4 | 4 | 4 | 4 |
| N—oxydiethylene-2-benzothiazole sulfeneamide | 0.6 | 0.7 | 0.7 | 0.8 | 0.7 |
| di-2-benzothiazyl disulfide | 0.2 | 0.2 | 0.2 | 0.2 | 0.2 |
| p-amylphenol disulfide | 2.0 | 2.0 | 2.0 | 2.0 | 2.0 |
| Results | | | | | |
| Strength at rupture (Tb) (kg/cm²) | 255 | 243 | 223 | 218 | 215 |
| Wet skid resistance (%) | −5 | −4 | +1 | +2 | +1 |
| Rolling resistance (%) | +12 | +8 | +6 | +6 | +7 |
| Wear resistance (index) | 98 | 99 | 101 | 109 | 103 |

From Table 2, it can be seen that the object of the invention can be achieved even when using the novel styrene-butadiene copolymer rubber in an amount of at least 30 parts by weight per 100 parts by weight of total rubber content.

What is claimed is:

1. A pneumatic tire having a tread, which comprises using in said tread a rubber composition comprising (1) a styrene-butadiene copolymer rubber as defined below alone or a blend rubber of not less than 30 parts by wt. of said styrene-butadiene copolymer rubber and not more than 70 parts by wt. of a diene rubber, and containing (2) 10 to 120 parts by wt. of carbon black based on 100 parts by wt. of said styrene-butadiene copolymer rubber or said blend rubber, and (3) 0.5 to 5 parts by wt. of a vulcanizer based on 100 parts by wt. of said styrene-butadiene copolymer rubber or said blend rubber, said styrene-butadiene copolymer rubber being obtained by random copolymerization of styrene with 1,3-butadiene and satisfying the following requirements:

(a) the content of bound styrene is 12 to 35% by weight;

(b) the content of 1,2-bond in the butadiene portion is 30 to 40% by weight, (c) the content of trans-1,4 bond in the butadiene portion is not less than 42% by weight;

(d) the value obtained by subtracting the content of cis-1,4 bond in the butadiene portion from said content of trans-1,4 bond is not less than 8% by weight;

(e) the relation between said content of bound styrene and said content of 1,2-bond is $65 \leq 1.7$ times the content of bound styrene in % by weight plus the content of 1,2-bond in % by weight $\leq 100$; and (f) the ratio of weight mean molecular weight ($\overline{M}_w$) to number mean molecular weight ($\overline{M}_w$) is not more than 2.3.

2. A pneumatic tire according to claim 1, wherein said carbon black has an iodine adsorption value of not less than 36 mg/l and a dibutyl phthalate adsorption value of not less than 60 ml/100 g.

3. A pneumatic tire according to claim 1, wherein said vulcanizer is at least one substance selected from the group consisting of sulfur, p-quinone dioxime, p,p'-dibenzoylquinone dioxime, 4,4'-dithiodimorpholine, poly-p-dinitrosobenzene, ammonium benzoate and alkylphenol disulfide.

* * * * *